(12) United States Patent
Townsend

(10) Patent No.: US 10,259,069 B2
(45) Date of Patent: Apr. 16, 2019

(54) WELDING ELECTRODE HOLDER

(71) Applicant: Carl Townsend, Wilmington, MA (US)

(72) Inventor: Carl Townsend, Wilmington, MA (US)

( * ) Notice: Subject to any disclaimer, the term of this patent is extended or adjusted under 35 U.S.C. 154(b) by 499 days.

(21) Appl. No.: 14/867,195

(22) Filed: Sep. 28, 2015

(65) Prior Publication Data
US 2017/0087658 A1 Mar. 30, 2017

(51) Int. Cl.
B23K 9/28 (2006.01)

(52) U.S. Cl.
CPC .................................. B23K 9/282 (2013.01)

(58) Field of Classification Search
CPC .......... B23K 9/24; B23K 9/282; B23K 9/285; B23K 9/287; B23K 9/32; B23K 11/31
USPC ........................................ 219/140, 141, 142
See application file for complete search history.

(56) References Cited

U.S. PATENT DOCUMENTS

| 1,217,468 | A | 2/1917 | Lincoln |
| 2,538,245 | A | 1/1951 | Hiller |
| 2,766,646 | A | 9/1955 | Marble |
| 2,797,307 | A * | 6/1957 | Goodwin ............... B23K 9/282 219/143 |
| 2,930,884 | A | 3/1960 | Monax |
| 2,936,365 | A | 5/1960 | Niemi |
| 3,045,109 | A * | 7/1962 | Heggy .................. B23K 9/282 219/143 |
| 3,059,100 | A * | 10/1962 | Minnick ............... B23K 9/282 219/144 |
| 3,219,793 | A | 11/1965 | Mahoney |
| 7,825,351 | B2 | 11/2010 | Schneider |
| 2006/0191907 | A1 | 8/2006 | Henley et al. |
| 2008/0128398 | A1* | 6/2008 | Schneider ............... B23K 9/28 219/141 |

FOREIGN PATENT DOCUMENTS

| CA | 1 198 760 | 12/1985 |
| EP | 0 335 778 | 10/1989 |

* cited by examiner

Primary Examiner — Dana Ross
Assistant Examiner — Brandon T Harvey
(74) Attorney, Agent, or Firm — Lambert Shortell & Connaughton; Gary E. Lambert; David J. Connaughton, Jr.

(57) ABSTRACT

A welding electrode holder is provided. The welding electrode holder comprises a handle and electrode clamps extending nearly perpendicularly from the handle, thereby providing easy loading and unloading of electrodes, coupled with secure holding of the electrode during operation.

14 Claims, 5 Drawing Sheets

WELDING ELECTRODE HOLDER

BACKGROUND OF THE INVENTION

Field of the Invention

The present invention relates generally to welding electrode holders. More particularly the present invention relates to a device that has spring loaded jaws to hold a welding electrode perpendicularly to the electrode holder handle.

Description of Related Art

Traditional electrode holders for stick welding include either a spin loose and spin tight electrode holder, or a clamp having jaws that are parallel to the electrode holder handle. Each of these suffers from a number of disadvantages.

The spin loose and spin tight electrode holders suffer from making the process of replacing electrodes very slow and cumbersome. Replacement of electrodes must be done frequently throughout a day's work, which results in excessive down time for a welder when using such an electrode holder.

The parallel jaw clamp electrode holders, while allowing easy replacement of electrodes, do not firmly and securely hold the electrode. This makes it more difficult to use, especially when finesse is required, and can lead to unsafe and unstable operation.

Therefore, what is needed is a device that may provide stable electrode holding for stick welding, that may also allow for quick and easy replacement of the electrodes.

SUMMARY OF THE INVENTION

The subject matter of this application may involve, in some cases, interrelated products, alternative solutions to a particular problem, and/or a plurality of different uses of a single system or article.

In one aspect, a welding electrode holder is provided. The electrode holder is formed by a body which provides the structure for the electrode holder. The body has a handle and a jaws region, with the body defining an interior aperture. A pair of jaws are positioned within the jaws region of the body. The jaws are movable between an open position and a closed position, and are biased towards the closed position. An opening on a front face of the jaws region of the body allows an electrode to pass through the body to access the pair of jaws. A tab extends out of the body at the handle. This tab is in communication with at least one of the pair of jaws, and is movable to bring the pair of jaws between the open and closed position. A cable connector is positioned at the bottom of the handle. The cable connector is configured to connect a cable from a welding machine to the electrode holder. An electrical connector is positioned within the aperture of the body and provides electrical communication between the cable connector, through the body to at least one of the pair of jaws. The jaws are oriented nearly perpendicular to the handle, and extend outward from the handle nearly perpendicularly to the handle. As such the handle can be gripped comfortably and safely by the user while the electrode extends away from the user, towards the welding surface.

In another aspect, a welding electrode holder is provided. The electrode holder is formed by a body which provides the structure for the electrode holder. The body has a handle and a jaws region, with the body defining an interior aperture. A pair of jaws are positioned within the jaws region of the body. A bottom jaw of the pair is movable between an open position and a closed position, and is biased towards the closed position. The body defines an opening on a front face of the jaws region which allows an electrode to pass through the body to access the pair of jaws. A groove is formed into at least one of two opposing faces of the pair of jaws, which provides a seat for the electrode to be received.

In this aspect, a thumb tab extends from a portion of the handle, with the handle defining an aperture that allows the protruding thumb tab to slide along a part of a length of the handle. The thumb tab is in communication with the bottom jaw and is movable to bring the bottom jaw between the open and closed position. A cable connector is positioned at the bottom of the handle. The cable connector is configured to connect a cable from a welding machine to the electrode holder. Within the handle, a metal shaft extends from the cable connector at its proximal end, through the body to a top of the body and connecting at its distal end to the top jaw. The metal shaft provides electrical communication between the cable connector, through the body interior aperture to the pair of jaws. Further, the bottom jaw forms an aperture through which the metal shaft passes, with the bottom jaw being slidable along the shaft when moving between the open and closed positions. The jaws are oriented nearly perpendicular to the handle, and extend nearly perpendicularly to the handle. As such the handle can be gripped comfortably and safely by the user while the electrode extends away from the user, towards the welding surface.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an electrode holder having spring loaded jaws that are oriented perpendicularly to a handle of the holder. The electrode holder comprises a body having a handle and a jaw region. In the jaw region are two jaws that are movable between an open and closed position. A spring or other force-applying structure provides a bias to urge the jaws towards the closed position, such that a welding electrode may be securely held in place between the jaws. A thumb tab or other structure extends out of the handle to allow a user to urge the jaws apart against the bias of the spring. This tab may be electrically insulated as a safety measure. The result of the present invention is an improved welding electrode holder which allows superior control, stable holding, and fast, easy loading and removal of electrodes.

Moreover, the present invention may further have a fast removable bottom cap and easy cable connection. For example, the cap may be connected to a bottom of the handle by a threaded connection. The cap is configured to insulate the cable and body from any electrified or electrifiable components. Similarly, the cable connection may, in one embodiment, be achieved by a set screw in a bottom of the handle that allows easy loosening and tightening of the cable to hold it in place.

In a particular embodiment, the body of the electrode holder contains a one piece sliding jaw and trigger. The term one piece may refer to a single unitary element, or separate pieces in contact with each other. This one piece jaw and trigger is slidable between an open and closed position while maintaining electrical connection to an element that provides electric current to one or both jaws, a non-conductive portion of the one piece jaw and trigger extends out of the body and acts as the trigger to allow the sliding. In this embodiment, this element, as well as the spring (or other force applying element urging the jaws closed) and electrical connecting components are housed within the body.

Figure 1:
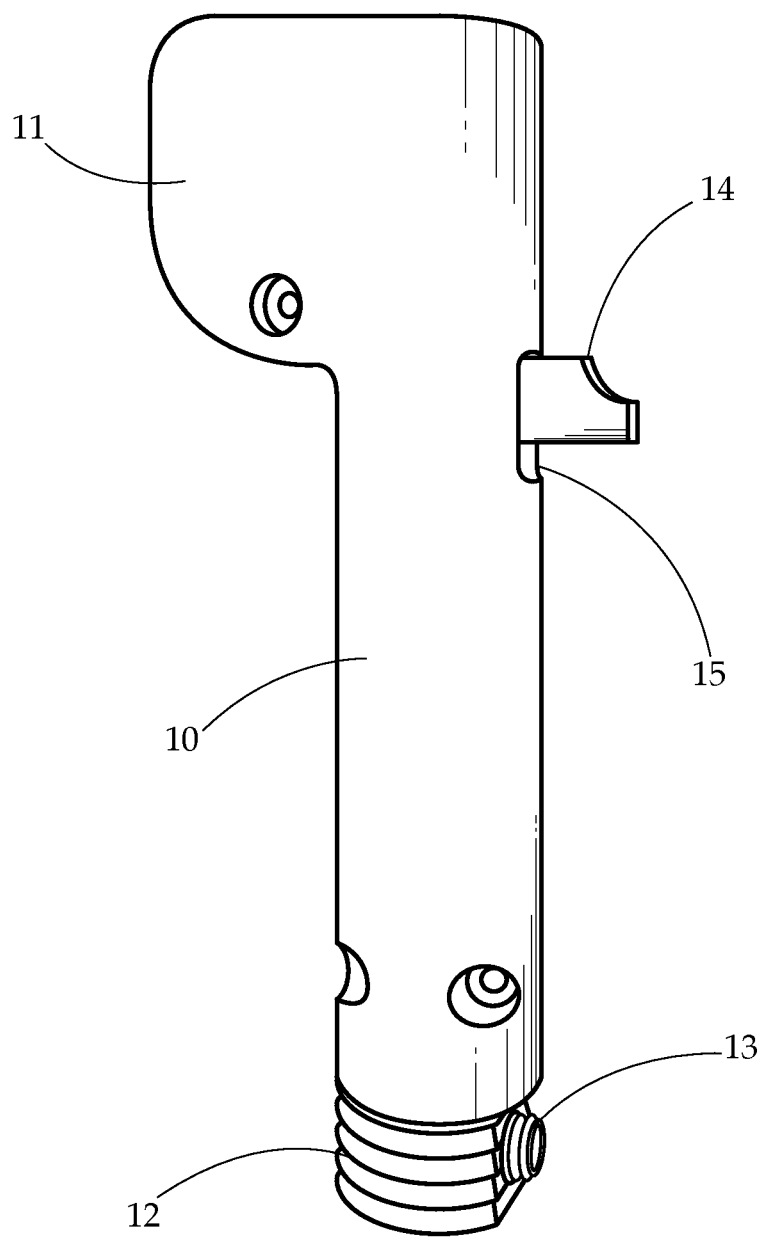
FIG. 1 provides an elevation view of an embodiment of the electrode holder of the present invention.

Turning now to FIG. 1 a side view of an embodiment of the electrode holder is provided. The electrode holder has a body formed of a handle 10 and a jaw region 11. The jaw region 11 extends perpendicularly, or nearly perpendicularly away from the handle 10 at a top of the handle 10. Tab 14 extends from the handle 10 and is movable between a top and bottom of slot 15 formed into the handle 10. At a bottom of the handle 10 is a cable connector 12 which extends out of the handle. The cable connecter 12 has a hole in its center (not shown) into which a cable from a welding machine can be inserted. The cable slides into this connector 12, and then is tightened in place by set screw 13, providing electrical communication from the welding machine (not shown) to the jaws of the jaw portion 11. However, it should be understood that in varying embodiments, the cable from the welding machine may be attached in any manner. Cable connector 12 is shown having threads on its outer portion. These threads may allow an insulating cap to be attached over the connector 12 and cable, thereby insulating the connector 12 from outside contact, and in some embodiments, generally securing the cable.

Figure 2:
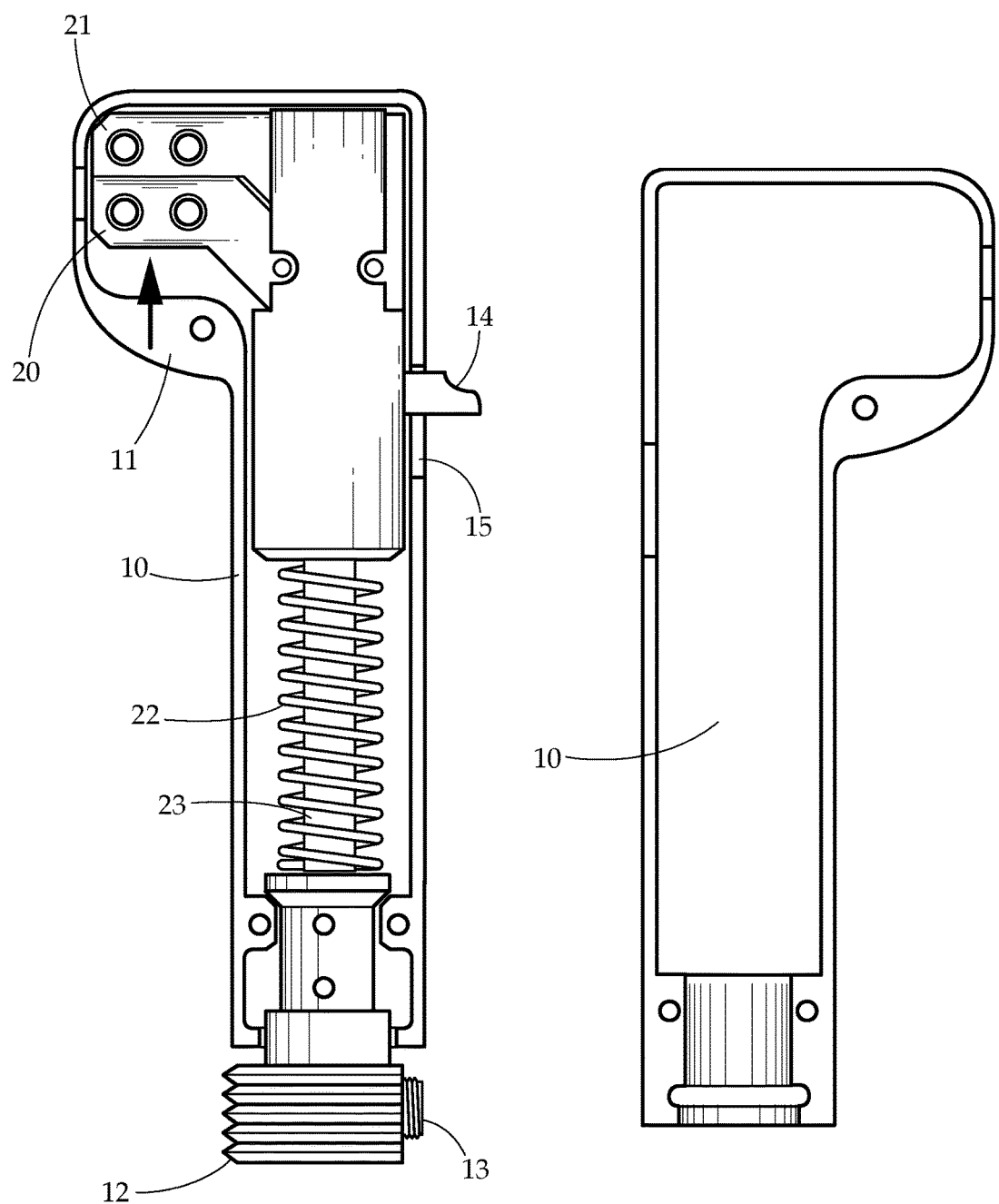
FIG. 2 provides an elevation cut away view of another embodiment of the electrode holder of the present invention.
Figures 3, 4:
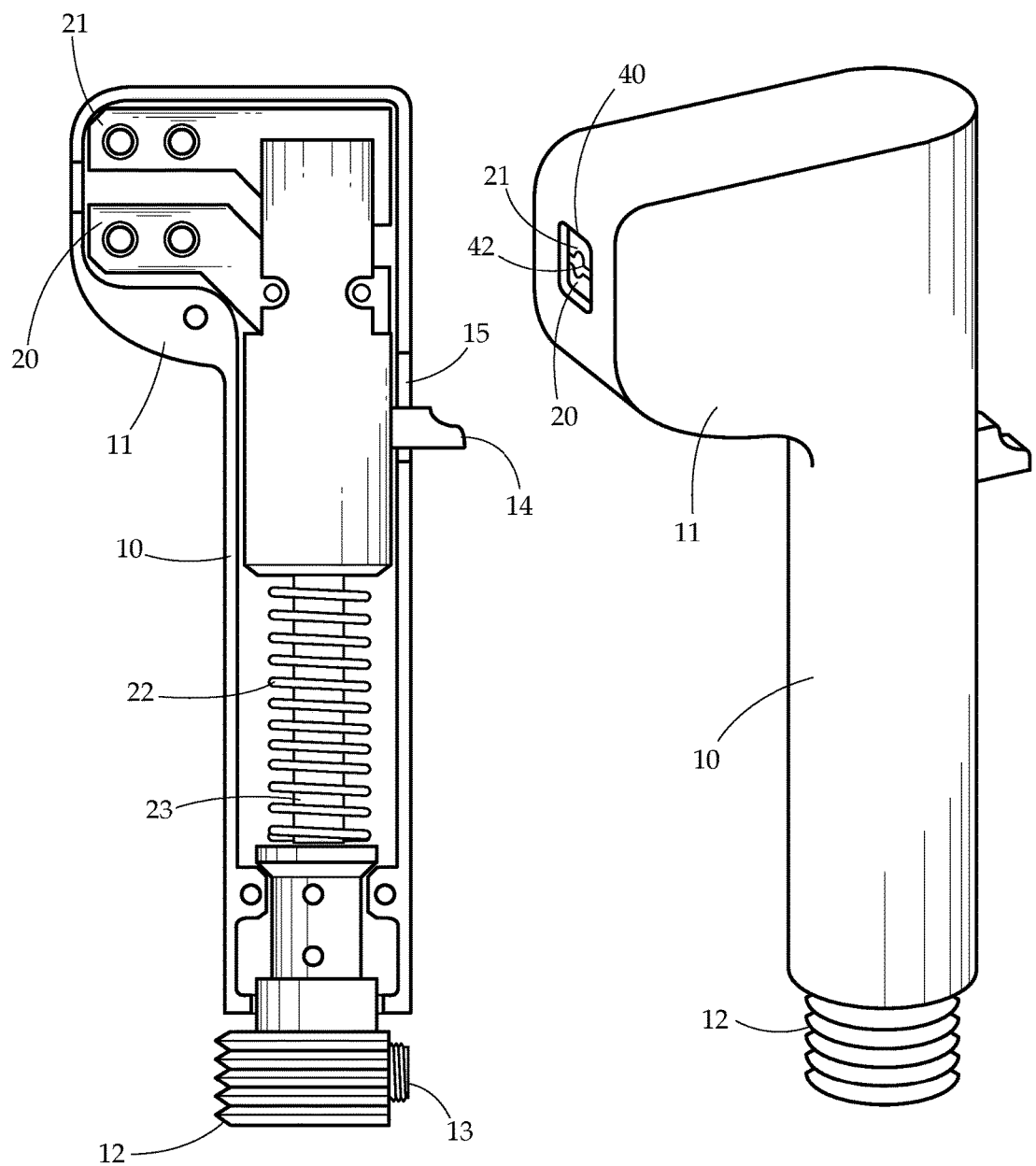
FIG. 3 provides an elevation cut away view of yet another embodiment of the electrode holder of the present invention.
FIG. 4 provides a front perspective view of still another embodiment of the electrode holder of the present invention.

FIGS. 2 and 3 show an embodiment of the electrode holder in a cutaway side view. In this view, the internal components of the electrode holder can be seen. Within the jaw region 11 are jaws 20 and 21. In this embodiment, bottom jaw 20 is movable between a first closed position, shown in FIG. 2, abutting the top jaw 21, and a second open position, as shown in FIG. 3, with a spacing between it and the top jaw 21. An electrode (not shown) can be placed between the two jaws when in the open position, and once the tab 14 is released, the jaws 20, 21 will be urged towards each other, holding the electrode in place. In the embodiment shown, spring 22 is positioned over a portion of the shaft 23. Spring 22 is configured such that it provides a force against bottom jaw 20 through an insulated portion near tap 14 urging bottom jaw 20 upward. Bottom jaw 20 can be moved downward against the force of spring 22, and when this opposing force is released, jaw 20 will again be urged upward until contacting either top jaw 21, or an electrode placed there between. While the figures show the spring 22 as the force device urging the bottom jaw 20 upward, it should be understood that any force-applying structure may be used without straying from the scope of the present invention. For example, a piston, flexible material, elastic, and the like may all be used as substitutions for the spring 22.

Bottom jaw 20 is connected to, or integrally formed with tab 14. This connection allows tab to slide bottom jaw 20 between the open and closed position. A shaft, the lower portion of which is shown as element 23, extends upward from the cable connector 12 through the body to the top jaw 21, and provides electrical communication from the cable connector 21 to both the bottom and top jaws 20, 21. However, it should be understood that any related structure may provide this electronic communication without straying from the scope of the present invention. Typically, top jaw 21 is fixed, however it should be understood that in varying embodiments, top jaw may be the moving jaw, or both jaws could move (such as in a scissoring motion), without straying from the scope of the present invention.

As shown in the figures, in many embodiments the jaws 20, 21, and jaw receiving region 11 are oriented perpendicularly or nearly perpendicularly to the handle. This allows for optimal control and operation of the electrode during the stick welding process. As used herein, the term nearly perpendicularly means that the jaws are oriented between 75 and 105 degrees relative to a major axis of the handle, and generally will be oriented at 90 degrees to the major axis of the handle.

FIG. 4 provides a front perspective view of an embodiment of the electrode holder. In this view, a front aperture 40 defined by a front of the jaw region 11 can be seen. Electrodes that are to be held by jaws 20, 21 can be inserted through this aperture 40 to reach the jaws 20, 21. Grooves 42 can be seen formed into the facing surfaces of each jaw 20, 21. Each groove 42 is shaped to receive an electrode and will help limit side to side directional movement of the electrode when received between the jaws 20, 21. In alternative embodiments, the jaws may have only a groove in one of the jaws, or may have not grooves, without straying from the scope of the present invention.

Figure 5:
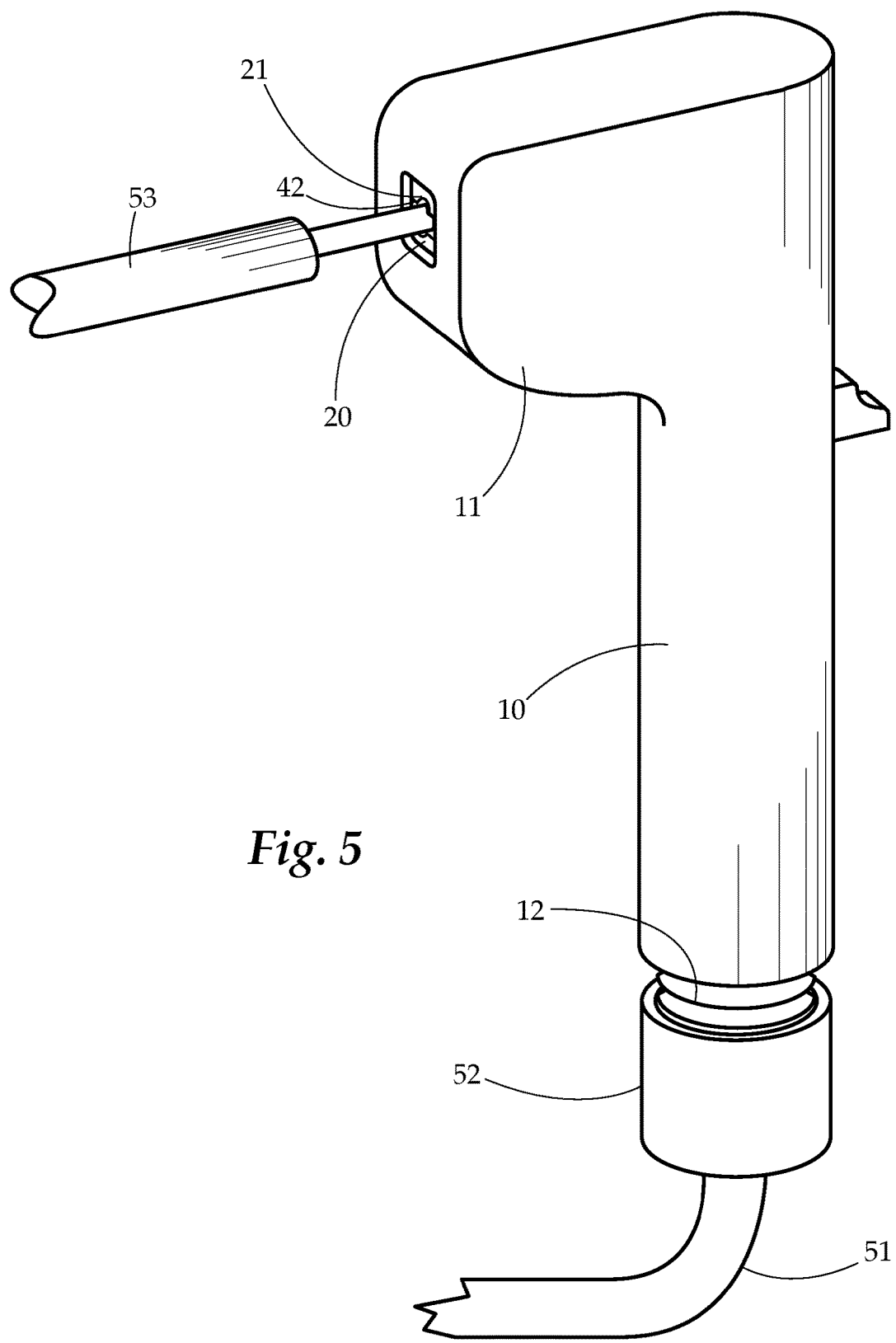
FIG. 5 provides a front perspective view of another embodiment of the electrode holder of the present invention.

FIG. 5 provides a front perspective view of another embodiment of the electrode holder. Here, a welding electrode 53 can be seen passed through aperture 40 and received by the jaws 20, 21. It should be understood that because of the adjustable jaw configuration of the present invention, any electrode size may be used effectively. For example, electrodes having diameters ranging from 3/16" to 1/16" may all be received by the same electrode holder. Further, cable 51 is shown connected to the handle 10 of the holder. Cable provides electronic communication between a welding machine (not shown) and the electrode 51 via the jaws. End cap 52 is shown connected to the cable connector 12, covering and thus insulating the exposed electronic components. In this particular embodiment the end cap 52 is threadedly attached to the cable connector 12, but it should be understood that it may be attached in any manner without straying from the scope of the invention.

Figure 6:
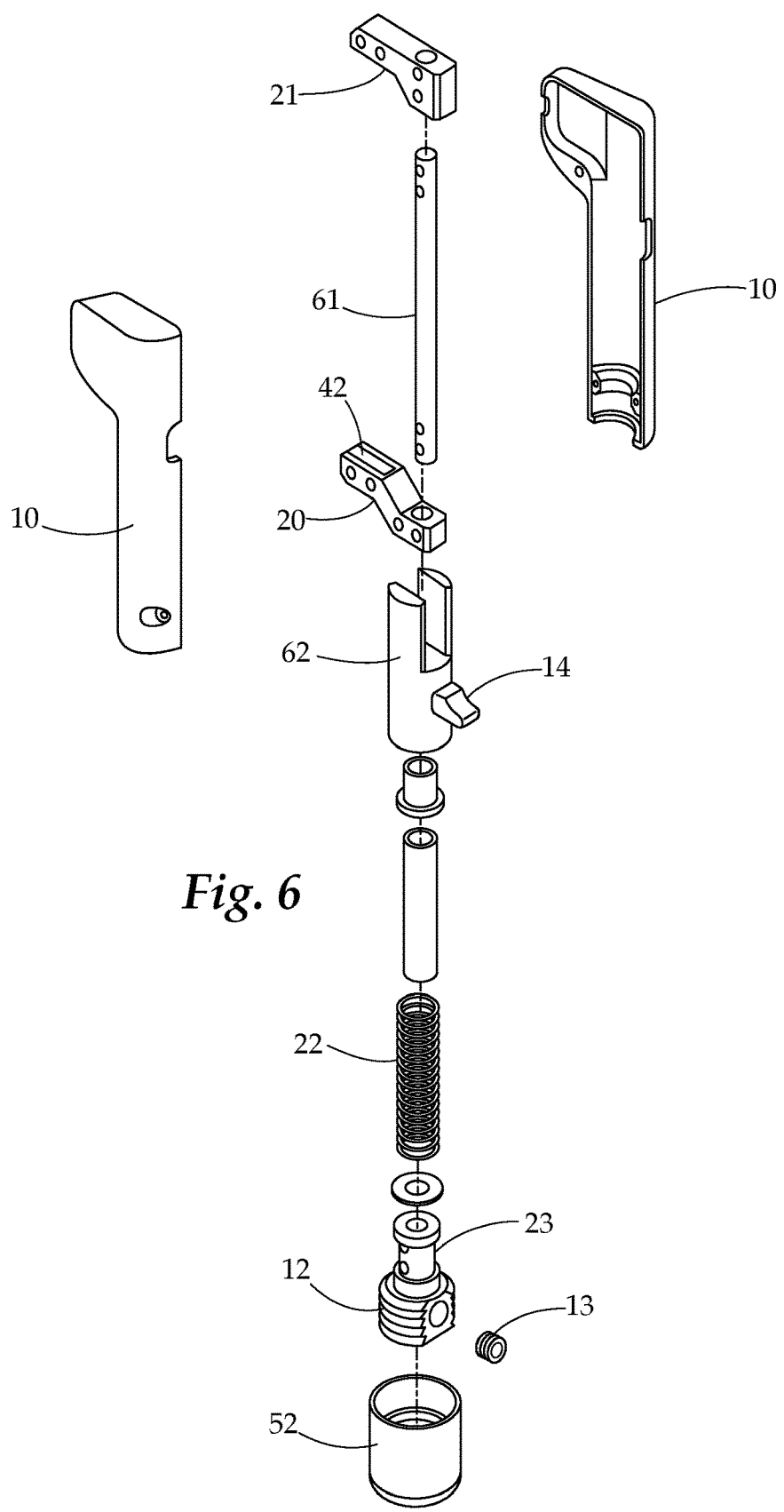
FIG. 6 provides an exploded view of an embodiment of the present invention.

FIG. 6 provides an exploded view of an embodiment of the electrode holder. In this view, the embodiment of the handle 10 is shown as a two piece housing, though it should be understood that any type of housing may be used. In this view, conductive shaft 61 can best be seen. This shaft extends from cable connector 12, through the length of the body, through the bottom jaw 20 and into top jaw 21. In this embodiment, bottom jaw 20 is slidably connected to the shaft 61, such that it can move between the open and closed positions. As noted above, it will be understood that the slidable structure may be achieved in other manners without straying from the scope of this invention. In another similar embodiment, the bottom jaw 20 may slide against the shaft 61. In the embodiment shown, bottom jaw 20 is connected to spacer 62 which also is slidable along shaft 61. Spacer 62 additionally forms tab 14 which allows movement of the bottom jaw 20 between the open and closed positions.

Spring 22 is in position between a flange of shaft 23 and spacer 62, allowing it to exert a pressure force against spacer 62, urging it upwards. End cap 52 can be seen configured to be attached over the cable connector 12.

In operation, the electrode holder of the present invention allows for quick, easy and secure electrode replacement during the stick welding process. Initially, in one embodiment of use, a user will load a first electrode by opening the jaws from the closed position, insert the electrode holding end between the jaws, and release the jaws, allowing them to move back towards the closed position. The jaws will then be urged against the electrode, holding it in place. In embodiments having grooves to receive the electrode, the electrode will be placed in the groove and will be further secured as the jaws close over it. As the electrode is consumed during welding, and needs replacing, the user will draw the jaws again towards the open position, releasing the electrode. The electrode may be removed by hand, or gravity may allow it to fall freely. The user may then retrieve a new electrode, and secure it as described above.

The present invention may be made of any materials capable of supporting an electrode and being operated by hand to withstand the repeated stresses on the device during operation. The internal structure must be able to provide an electrical connection between the cable and the electrode. This may be through electrical structure integrated into the jaw/tab components, or may be separate elements. Moreover, at least a part of the handle must be a non-conductive structure. This may be achieved by making the handle of non-conductive material, or by fully separating a conducting material from the structure noted above that provides electrical connection to the electrode. Examples of materials that the electrode holder may be made include, but are not limited to, plastics, ceramics, metals, composite materials, combinations of such materials, and the like.

In a further embodiment, the electrode holder may be equipped with a heat shield. The heat shield may extend from the body—either the handle 10 or jaw region 11, to shield a user's hands, wrists and arms from heat coming from the welding process. The heat shield may be any structure that may at least partially block infrared radiation from the welding process. For example, the shield may be a metal, plastic, or composite material that extends over the handle 10.

In yet another embodiment, the electrode holder may additionally comprise an ejecting structure that urges or forces the spent electrode out of the holder when opening the jaws. For example, the ejecting structure may be a plunger that moves forward when the jaws are moved to the open position. The plunger may be spring loaded, or may be connected to the jaws to move relative to them.

In a particular embodiment, the electrode holder may have no exposed electrified components, save for the jaws through the aperture at the front of the jaw portion. This allows for enhanced safety to prevent accidental electrocution, fires, and the like.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A welding electrode holder comprising:
    a body, the body providing structure for the electrode holder, and having a handle and a jaws region, the body defining an interior aperture;
    a pair of jaws within the jaws region of the body, the jaws movable between an open position and a closed position, the pair of jaws biased towards the closed position;
    a tab in communication with at least one of the pair of jaws extending out of the body, the tab movable to bring the pair of jaws between the open and closed position;
    wherein the pair of jaws are oriented nearly perpendicular to the handle; and
    wherein the pair of jaws are biased towards the closed position by a spring positioned within the handle, the pair of jaws movable to the open position against a force applied by the spring;
    wherein the tab is a thumb tab extending from a portion of the handle, the handle defining an aperture that allows the thumb tab to move in a linear lengthwise direction of the handle towards a bottom of the handle in a first direction, and towards the jaw region in a second opposite linear direction,
    further comprising a cable connector at the bottom of the handle, and an electrical connector providing electrical communication between the cable connector, through the handle to each of the pair of jaws;
    wherein the electrical connector is a metal shaft extending from the cable connector at its proximal end, through the handle to a top of the body and connecting at its distal end to a top jaw of the pair of jaws; and
    wherein a bottom jaw of the pair of jaws forms a jaw aperture through which the metal shaft passes, the bottom jaw slidable along a length of the shaft by movement along the metal shaft passing through the jaw aperture when moving between the open and closed positions, a movement of the bottom jaw controlled by a movement of the thumb tab sliding along the part of the length of the handle as defined by the jaw aperture, the movement of the bottom jaw being in a same direction as the movement of the thumb tab.

2. The welding electrode holder of claim 1 wherein a groove is formed into at least one of two opposing faces of the pair of jaws.

3. The welding electrode holder of claim 1 wherein the top jaw of the pair of jaws is fixed in position.

4. The welding electrode holder of claim 1 further comprising a end cap attached to the cable connector at a bottom of the handle, the end cap covering an electrically conductive portion of the cable connector.

5. The welding electrode holder of claim 1 wherein the tab is in a one-piece construction with the bottom jaw.

6. The welding electrode holder of claim 1 wherein the jaws are formed at least partially of a conductive material in communication with the electrical connector.

7. The welding electrode holder of claim 1 further comprising a welding electrode received by the pair of jaws, and a welding cable connected by the cable connector at the bottom of the handle, electrically connecting a welding machine to the electrode.

8. A welding electrode holder comprising:
    a body, the body providing structure for the electrode holder, and having a handle and a jaws region;
    a pair of jaws within the jaws region of the body, a bottom jaw of the pair being movable between an open position and a closed position, the pair of jaws biased towards the closed position, the body defining an opening on a front face allowing an electrode to pass through the body to access the pair of jaws;

a thumb tab extending from a portion of the handle, the handle defining an aperture that allows the thumb tab to move in a linear lengthwise direction of the handle towards a bottom of the handle in a first direction, and towards the jaw region in a second opposite linear direction, the thumb tab in communication with a bottom jaw of the pair of jaws, the thumb tab movable to bring the bottom jaw between the open and closed position;

a cable connector at the bottom of the handle;

a metal shaft extending from the cable connector at its proximal end, through the body to a top of the body and connecting at its distal end to a top jaw of the pair of jaws, the metal shaft providing electrical communication between the cable connector, through the body to each of the pair of jaws;

wherein the pair of jaws are formed at least partially of a conductive material in communication with the metal shaft; and wherein the jaws are oriented nearly perpendicular to the handle;

wherein the body handle and jaw region contain the pair of jaws, the metal shaft and a part of the thumb tab; and wherein a bottom jaw of the pair of jaws forms a jaw aperture through which the metal shaft passes, the bottom jaw slidable along a length of the shaft by movement along the metal shaft passing through the jaw aperture when moving between the open and closed positions, the movement of the bottom jaw controlled by a movement of the thumb tab sliding along the part of the length of the handle as defined by the jaw aperture, the movement of the bottom jaw being in a same direction as the movement of the thumb tab.

9. The welding electrode holder of claim 8 wherein the pair of jaws are biased towards the closed position by a spring positioned within the handle, the jaws movable to the open position against a force applied by the spring.

10. The welding electrode holder of claim 8 further comprising a end cap attached to the cable connector, the end cap covering an electrically conductive portion of the cable connector.

11. The welding electrode holder of claim 8 further comprising a welding electrode received by the pair of jaws, and a welding cable connected by the cable connector, electrically connecting a welding machine to the electrode.

12. The welding electrode holder of claim 8 wherein a groove is formed into at least one of two opposing faces of the pair of jaws.

13. The welding electrode holder of claim 1 further comprising a spacer positioned within the body, the spacer being slideable along the shaft, and the bottom jaw connected to the spacer, the thumb tab extending from the spacer, the spring applying the force to the spacer.

14. The welding electrode holder of claim 9 further comprising a spacer positioned within the body, the spacer being slideable along the shaft, and the bottom jaw connected to the spacer, the thumb tab extending from the spacer, the spring applying the force to the spacer.

* * * * *